Nov. 9, 1965    K. G. KREUTER    3,216,331
ELECTRIC-PNEUMATIC PROCESS CONTROLLER
Filed May 24, 1963    2 Sheets-Sheet 1

INVENTOR.
Kenneth G. Kreuter
BY Birch and O'Brien
ATTORNEYS

Nov. 9, 1965   K. G. KREUTER   3,216,331
ELECTRIC-PNEUMATIC PROCESS CONTROLLER
Filed May 24, 1963   2 Sheets-Sheet 2
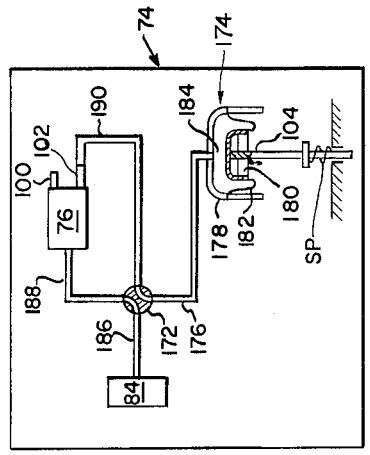
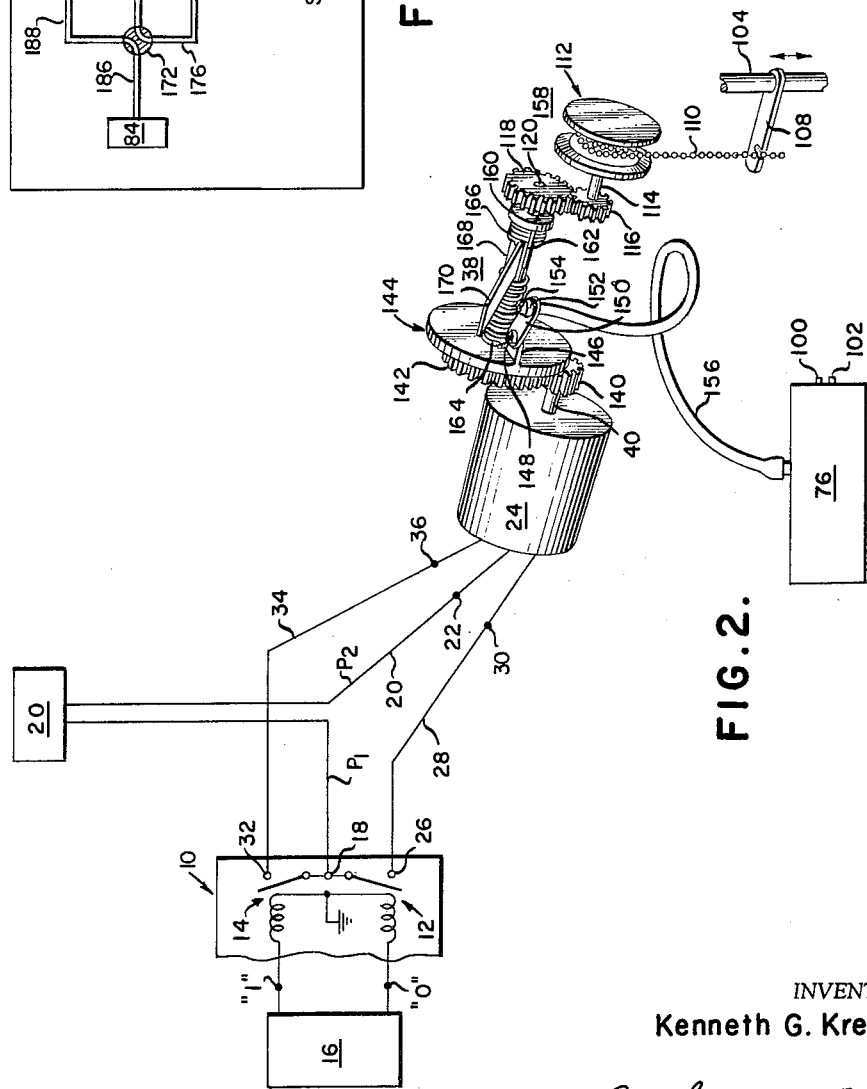
INVENTOR
Kenneth G. Kreuter
BY Birch and O'Brien
ATTORNEYS United States Patent Office 3,216,331
Patented Nov. 9, 1965

3,216,331
ELECTRIC-PNEUMATIC PROCESS CONTROLLER
Kenneth G. Kreuter, Goshen, Ind., assignor to Robertshaw Controls Company, Richmond, Va., a corporation of Delaware
Filed May 24, 1963, Ser. No. 282,936
11 Claims. (Cl. 91—382)

This invention relates generally to process controllers utilizing electro-pneumatic converters and more particularly, means for converting a duration modulated binary electric signal into a pneumatic control signal which ultimately positions, pneumatically, a control means such as the valve stem of a process control valve.

In dynamic control systems such as process controls having integral computer means as the "brain" or monitor thereof, it is often necessary to convert electric output signals from the computer into a functionally related class of signals such as pressure and/or displacement.

It is an object of this invention to provide a process control system or the like for first performing an electro-pneumatic conversion and subsequently converting the resulting pneumatic signal into a displacement functionally related to both the electric and the pneumatic signals in the system.

It is another object of this invention to provide a process control system or the like wherein a duration-modulated binary electric output signal from a digital computer or the like is first converted to a control pressure and that control pressure is subsequently converted to a displacement, the displacement being imposed on a movable control means.

Still another object of this invention is to provide a process control system or the like wherein a duration-modulated binary electric output signal from a digital computer or the like is first converted to a control pressure and that control pressure is subsequently converted to a displacement, the displacement being imposed on a movable control means, said system including a novel intercoupled input drive and displacement feedback means, whereby said system is highly stable.

Yet another object of this invention is to provide a system for pneumatically positioning a control valve or other displaceable control means in response to a duration-modulated multiple-state electric signal.

These and other objects of the invention will become more full apparent with reference to the following specification and drawings which relate to several preferred embodiments of the invention.

In the drawings:

FIGURE 2 is a schematic of another embodiment of the system of the present invention with the novel structural components thereof shown isometrically; and FIGURE 3 is a schematic pneumatic flow diagram illustrating another embodiment of the invention applicable to either of the systems of FIGURES 1 and 2.

Figure 1:
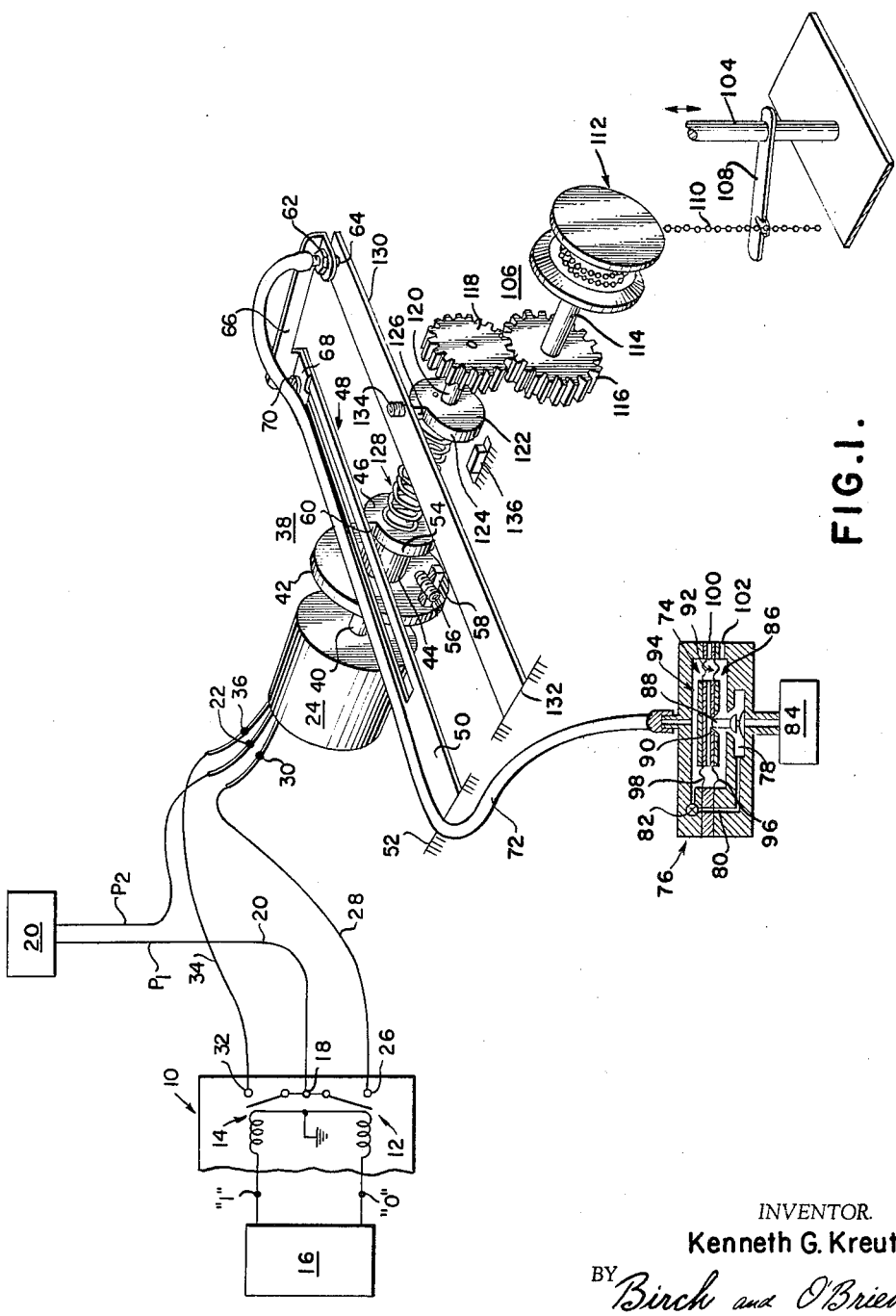
FIGURE 1 is schematic of one embodiment of the system of the present invention with the novel structural components thereof shown isometrically.

Referring in detail to the drawings, and more particularly to FIGURE 1, the embodiment of the invention shown therein will now be described.

The electrical input source 10 comprises first and second relay switches 12 and 14, respectively, representative of the two different states of a binary signal. The coils of the relay switches 12 and 14 are selectively energized by the binary output signal of a digital computer 16, generally shown in block diagram form as having two output leads "1" and "0" representing the binary output states of the said computer 16. The computer senses variations in the parameters of a process or the like which is being controlled by the present invention.

The relay switches 12 and 14 are connected with a common terminal 18, to which is connected a first power lead $P_1$. A second power line $P_2$, representing the other side of a suitable power supply 20, is directly connected to the common or neutral input terminal 22 of a reversible electric servo-motor 24.

The first relay switch 12 is connected to respond to a zero state output from the computer terminal "0" and is provided with a terminal contact 26 connected, via a lead 28, to an input terminal 30 on the servo-motor 24 which, when energized, causes the said motor to rotate in a counter-clockwise direction.

The second relay switch 14 is connected to respond to a unit state output from the computer terminal "1" and is provided with a contact terminal 32 connected, via a lead 34, to an input terminal 36 on the servo-motor 24 which, when energized, causes the said motor to rotate in a clockwise direction.

The servo-motor 24 comprises the motive means of an electro-pneumatic transducer generally indicated by the numeral 38.

The transducer 38 further includes the rotary output shaft 40 of the servo-motor 24, a manual override disk or wheel 42, integrally and coaxially mounted on the shaft 40, a cylindrical hub 44 integral with the wheel 42 and extending outwardly and coaxially therefrom, and an input or control cam 46 integrally mounted on the outer end of the hub 44 and adapted, along with the wheel 42 and hub 44 to rotate with and on the axis of the motor shaft 40. The above-defined combination of elements provides a mechanical displacement input to the electro-pneumatic transducer 38 as a function of the electric signal input to the servo-motor 24 as will be hereinafter more fully described.

A control follower 48 is provided for the control cam 46 in the form of a bifurcated elongated lever pivoted at its unitary end 50 to a suitable fixed pivot means 52. One leg of the bifurcated portion of the control follower 48 is engaged with the periphery 54 of the control cam 46, the said periphery 54 comprising the cam contour of the said control cam. An adjustable cam indexing means is provided in the form of a threaded cam indexing detent 56 which screws in and out of a fixed mount 58 positioned by any suitable means adjacent the periphery 54 of the control cam 46. The indexing detent 56 is adapted to engage the fall surface 60 on the peripheral cam contour 54 of the said control cam 46.

A leakport nozzle 62 having a leakport 64 in the tip thereof is mounted on the outer tip of an integral laterally extending arm 66 on a throttling range slide means 68 adjustably and slidably mounted for longitudinal adjustment on the bifurcated portion of the control follower 48, via a throttling range set-screw 70.

The leakport nozzle 62 is supplied with pneumatic pressure by means of a pressure hose 72 communicating with the pilot or signal chamber 74 of a stacked multiple diaphragm type pneumatic relay 76. The pilot pressure in the pilot chamber 74 is derived from the main air supply chamber 78 of the relay 76 via a bleed port 80 having an in-line flow restrictor 82 therein.

The main air chamber 78 is supplied by a suitable pressure source 84 and is connected with the output chamber 86 of the relay 76, known in the art as either the branch or control pressure chamber, by the lower half of a two-way relay poppet 88 seating internally of the main air chamber 78.

The upper end of the poppet 88 seats within the output chamber 86 on a diaphragm carried floating valve seat 90, whereby the output chamber 86 is controllably interconnected with the exhaust chamber 92. The valve seat 90 is part of a spacer structure 94 which separates and remains mobile with the two diaphragms 96 and 98 which, combined with the internal cavity of the relay 76, define the pilot, output and exhaust chambers 74, 86 and 92, respectively.

The exhaust chamber 92 is connected with the atmosphere via a vent port 100. The branch pressure or output chamber is delivered to any device to be controlled thereby via an output port 102.

The output port 102 is connected to the topwork of a pneumatically positioned valve, as will be hereinafter more fully described with respect to FIGURE 3, the valve not being shown in FIGURE 1.

The valve stem 104 is displaceable in response to various values of branch pressure from the relay 76, and this displacement is utilized as the input signal for the feedback mechanism 106 of the electro-pneumatic transducer 38.

An integral lateral extension 108, shown here as a flat radial lever, is provided on the valve stem 104. One end of a flexible link such as a ball chain or cable 110 is affixed to the extension 108, the other end and several convolutions thereof being wound on a rotatably mounted storage drum 112. Thus, the drum 112 is adapted to be rotated by the chain 110 in response to a displacement of the valve stem 104.

The drum 112 is integrally and coaxially mounted for rotation with a rotary shaft 114 which in turn drives an integrally and concentrically mounted first pinion gear means 116. The first gear 116 is intermeshed with and adapted to drive a second pinion gear means 118, the said second gear means being integrally and concentrically mounted on one end of a shaft 120.

A feedback cam means 122 is integrally mounted on the other end of the shaft 120 and is adapted to rotate therewith. The feedback cam contour comprises the periphery 124 of the feedback cam and includes a fast fall surface 126.

The cam shaft 120, the feedback cam 122, the control cam 46 and the servo-motor shaft 40 are mutually coaxial. The opposed end faces of the control and feedback cams 46 and 122, respectively, are interconnected by way of torsion spring means 128 anchored at each of its ends to one of the said end faces and coaxially disposed with respect to the said cams.

Mounted immediately adjacent the periphery 124 of the feedback cam 122 is an elongated feedback or leakport lever 130, pivoted at one end to a pivot means 132, coaxial with the pivot means 52 of the control follower, and extending to a position whereby the surface of the said leakport lever is engageable with the leakport 64 at a point adjacent the other end thereof.

A vertically adjustable threaded detent 134 extends through the leakport lever 130 into engagement with the periphery 124 of the feedback cam 122 and thus, comprises an adjustable cam follower for varying the vertical position of the leakport lever 130 as a function of the angular position of the feedback cam 122, and hence, the position of the valve stem 104.

A zero stop for the feedback cam 122 in the form of a fixed detent 136 is positioned adjacent the periphery 124 of the said cam and is adapted to engage the fast fall surface 126 when the cam is in the predetermined zero position.

Referring now to FIGURE 2, a second embodiment of the invention will now be described, like parts to FIGURE 1 bear the same numerals.

The electro-pneumatic transducer generally indicated at 138 is shown as including a first input pinion 140 is concentrically and integrally mounted on the servo-motor shaft 40. The first input pinion 140 is intermeshed with and adapted to drive a second input pinion 142, the said second pinion being an integral offset concentric portion of a rotary leakport positioning disc assembly 144. The assembly 144 also serves as a manual override device.

An integral shelf 146 is provided adjacent the periphery of the disk assembly 144 and on that face of the said disk assembly 144 removed from the second input pinion 142. The shelf 146 is adapted to threadably receive a throttling range screw 148 therein which acts as a positioning and hold-down means for one end of a flat control lever 150 extending outwardly from the shelf 146 in a plane perpendicular to the face of the disk assembly 144.

A leakport nozzle 152 is mounted through the control lever 150 adjacent the free end thereof with the leakport 154 therein opening upward as shown. The leakport nozzle 152 is supplied with pressure from the relay 76, already described with reference to FIGURE 1, via a pressure line or tube 156.

The feedback mechanism 158 of the embodiment of FIGURE 2 is identical to that of FIGURE 1 as to the valve stem 104, integral extension 108, chain 110, drum 112, drum shaft 114, first feedback pinion 116, second feedback pinion 18 and the rotary shaft 120.

The end of the shaft 120 removed from the second feedback pinion 118 mounts an integral concentric leakport lever control disc assembly 160. The control disc assembly 160 includes a longitudinally extending stop pin 162 which is radially offset with respect to the axis of rotation of the rotary shaft 120 and control disk assembly 160.

The control disk assembly 160 and the positioning disk assembly 144 are coaxially disposed. The opposing faces of the said disc assemblies are resiliently coupled together by first and second axially disposed torsion springs 164 and 166, respectively, the said springs being spaced apart at their respectively adjacent end portions by an axially disposed spacer means 168. The other end of the first torsion spring 164 is suitably anchored to the face of the positioning disk assembly 144 and the other end of the second torsion spring 166 is suitably anchored to the face of the control disc assembly 160.

As shown, the spacer 168 is of a cylindrical shape and in combination with the torsion springs 164 and 166 comprises a biased pivotal mounting for the leakport lever 170, which extends radially outward from the spacer 168 to a position above and adjacent the leakport 154.

Referring now to FIGURE 3, the flow diagram into and out of the relay 76, excluding the leakport connections thereto, is shown with a manual control valve 172 which is adapted to selectively bypass the relay 76 and connect the main air supply 84 directly with the valve top work 174 via a pressure line 176.

The valve topwork 174 is shown as comprising a cylinder 178, a piston 180 reciprocable in said cylinder and a diaphragm 182 defining an expansible chamber 184 between the upper end of the piston 180 and the cylinder 178.

The chamber 184 is directly supplied by the pressure line 176.

The valve stem 104 is axially and inegrally connected with the piston 180 for reciprocation therewith.

The main air supply 84 is connected with the valve 172 via a supply line 186. The valve 172 is connected to the input or main air inlet of the relay 76 via an input line 188 and the branch pressure output port 102 of the said relay is connected back through the valve 172 via an output line 190. When the relay is connected in the pneumatic circuit, the main air line 186 is connected through the valve 172 with the relay input line 188 and the relay output line 190 is connected with the chamber 184 in the valve topwork 174 via the manual valve 172 and the line 176.

Operation

Referring again to FIGURE 1, the operation of the embodiment shown therein will now be described.

A condition for all of the foregoing embodiments is that the outputs "1" and "0" from the computer 16 are duration modulated as a function of the sensed variations in process parameters, such that either the relay switch 12 or the relay switch 14 in the system input means 10 will be energized for various periods of time. This results in a selective completion of either a first motor circuit comprising power lead $P_1$, a common terminal 18, contact 26, line 28, motor terminal 30, common motor terminal 22 and power lead $P_2$ or a second motor circuit comprising power lead $P_1$, common terminal 18, contact 32, lead 34, motor terminal 36, common motor terminal 22 and power lead $P_2$. The said first circuit energizes the servo-motor 24 for counter-clockwise rotation for the duration of a zero state output signal from the "0" terminal of the computer 16 while the said second circuit energizes the servo motor 24 for clockwise rotation for the duration of a unit state output signal from the "1" terminal of the computer 16.

Referring specifically to FIGURE 1, and assuming a clockwise rotation of the output shaft 40 of the servo motor 24, the manual override wheel 42, hub 44 and leakport control cam 46 are all rotated in a clockwise direction for the duration of the unit state signal from the computer 16, after which the relay switch 14 will open and de-energize the servo motor 24.

On clockwise rotation, the control cam 46 raises the control follower 48 and consequently, the leakport 64 via the combination of throttling range slide 68 and leakport supporting arm 66. Thus, instantaneously, the leakport 64 is moved away from the leakport lever 130 permitting a greater flow therethrough to atmosphere. This results in a decrease in the pilot pressure in the pilot chamber 74 of the relay 76 since the said pilot chamber is supplied at a constant rate of flow via the pressure port 80 and in-line restrictor 82, the variable being the exhaust flow via the pressure tube 72 and leakport 64.

The reduction in pressure causes the spacer assembly 94 and diaphragms 96 and 98 to move upward in response to the force differential between the branch an pilot chambers 86 and 74, respectively, whereby the floating seat 90 is raised from the upper end of the relay poppet 88 and the branch pressure begins to exhaust to atmosphere via the exhaust chamber 92 and exhaust port 100.

Thus, referring additionally to FIGURE 3, an exhaust of branch pressure in the relay 76 results in a lowering of the branch pressure at the output port 102 thereof, causing a corresponding outflow and reduction in pressure in the expansible chamber 184 of the valve topwork 174 via the line 176, valve 172 and output line 190.

Assuming that the piston 180 is conventionally biased to move into the cylinder 178, such as by a compression spring SP coaxial with the valve stem 104, a reduction of pressure in the chamber 184 will result in a decreased force opposing the piston 180 and the piston 180 and valve stem 104 will move upwardly relative to the positions shown in FIGURES 1 and 3 in response to the said decrease in branch pressure and the force exerted thereon by the compression spring SP.

This causes the integral extension 108, see FIGURE 1, on the valve stem 104 to follow the stem 104 in its upward displacement and tend to slacken the chain 110.

The torsion spring 128 has already been constrained to store energy by the clockwise rotation of the control cam 46 and thus, via the feedback cam, second feedback pinion, first feedback pinion and drum shaft 114 to bias the drum 112 to rotate in a counter-clockwise direction.

The feedback chain 110 is wound on the drum 112 to be taken up thereby in the biased direction of rotation thereof. Thus, an upward displacement of the valve stem 104 causes the chain 110 to tend to slacken and be taken up by the drum 112 which rotates through an angle directly proportional to the said displacement. This permits the feedback cam 122, via the drum shaft 114, first and second feedback pinions 118 and 116 and rotary shaft 120 to follow the control cam in clockwise rotation in an amount proportional to the displacement of the valve stem 104. The result is to constrain the leakport lever 130 to follow the upward displacement of the leakport 64 via the the feedback cam contour 124 and feedback cam follower 134 to decrease the leakport flow and tend to balance the entire system by creating an increase in pressure in the pilot chamber 74 of the relay 76.

The valve stem 104 will continue to be displaced until the pilot pressure decrease imposed on the system via the signal input to the servo motor 24 has been completely nullified by the action of the feedback means 106 constraining the leakport lever 130 to follow the leakport 64 until the flow therethrough has been modulated to a decreased value sufficient to restore the initial value of pilot pressure in the pilot chamber 74 of the relay 76.

The restoration of initial pilot pressure eliminates the differential between the branch and pilot chambers 86 and 74, respectively, and the floating valve seat 90 is reseated on the relay poppet 88, holding the branch pressure at its resulting lower controlled value and balancing the relay. The valve stem 104 and its associated process control valve means (not shown) have now fully responded to the constraint imposed on the system by the output signal from the computer 16 and have been displaced in an amount having a preselected functional relationship to the state and duration of the said computer output signal.

Referring now to FIGURE 2, and assuming the same clockwise rotation of the motor shaft 40 and the other conditions assumed for FIGURE 1, the first input pinion 140 is rotated clockwise with the shaft 40 and drives the leakport positioning disk assembly 144 in a counterclockwise direction via the second input pinion 142.

As a result, the leakport 154 is moved through the same angle of rotation as the motor shaft 40 in a peripheral arc determined by the position of the control lever 150 on the integral shelf 146 of the positioning assembly 144.

This displacement of the leakport 154 is away from the leakport lever 170 which, instantaneously, remains in a fixed position, resulting in an increased flow through the leakport and a resulting drop in pilot pressure in the pneumatic relay 76.

As previously described with respect to FIGURES 1 and 3, and referring now additionally to FIGURE 3, the drop in pilot pressure causes a decrease in branch pressure which is transmitted from the relay output port 102 to the expansible chamber 184 of the process control valve topwork 174 via pressure line 170, valve 172 and pressure line 176. The resulting effect, as previously described, is to cause the piston 180 and the integral process control valve stem 104 to be displaced upward with respect to the position shown in FIGURES 2 and 3.

Initially, because of the torsion spring coupling comprising the first and second torsion springs 164 and 166, respectively and the axial interconnecting spacer 168 therebetween, the leakport lever 170 is biased to follow the leakport 154. However, the stop pin 162 on the control disk assembly 160 engages the lower surface of and imposes a constraint on the leakport lever 170, via the feedback mechanism 158, whereby the leakport lever 170 only follows the leakport 154 at a rate and through an angular displacement, respectively, proportional to the rate of displacement and displacement of the process control valve stem 104. The upward displacement of the valve stem 104 permits the chain 110, via the extension 108, to tend to slacken. The bias of the torsion springs 164 and 166 cause the control disk assembly 160 to rotate counter-clockwise, whereby, via the shaft 120, the second feedback pinion 118 rotates counter-clockwise, the first feedback pinion 116 is driven clockwise and the drum shaft 114 and drum 112 rotate clockwise with the said first feedback pinion 116 to take up the slack in the chain.

The leakport lever 170 will rotate toward the leakport 154 and the pilot pressure in the relay 76 will thus be continuously modulated toward a final increased value which will balance the relay 76 when the valve stem 104 has reached a final position in satisfaction of the constraint imposed on the entire system by the duration-modulated input from the computer 16 to the servo-motor 24.

The continuous modulation of pilot pressure in both the embodiments of FIGURES 1 and 2 prevents overshoot of the valve stem 104 with respect to the desired displacement imposed thereon by the input signal. The system, in both embodiments is thereby rendered highly stable.

The throttling range or operating range of the system is controlled, in the embodiment of FIGURE 1, by longitudinally displacing the range slide 68 along the bifurcated section of the control follower 48. This moves the leakport 64 longitudinally of the leakport lever 130, whereby the relative angular displacement of the leakport 64 and leakport lever 130 is selectively varied, producing a corresponding variation in the range of flow rates and resulting pilot pressures which can be effected.

In the embodiment of FIGURE 2, the leakport 154 is movable radially with respect to the axis of rotation of the control disk assembly 160, via the pivoted control lever 150, whereby the relative angular displacement between the leakport 154 and the leakport lever 170 to effect a variation in the throttling range as described above with respect to FIGURE 1.

In case of electric power failure or malfunction, both the embodiments of FIGURES 1 and 2 are provided with manual override means for placing input constraints on the system. Rotation of the manual override disk 42 of FIGURE 1 or the positioner disk assembly 144 of FIGURE 2 will cause the same resulting control of the valve stem 104 as is provided by the rotation of the motor shaft 40 of the servo-motor 24.

Thus, as described above, this invention provides a novel computer-coordinated process control wherein a process parameter is sensed by the computer and converted to a duration modulated binary or other multi-state output signal; the computer output signal is selectively coupled, according to its state to the input terminals of a bi-directional or multi-directional servo-motor, respectively; the servo-motor produces a directional output displacement proportional to the duration of the input signal state and in a direction determined by the said signal state and imposes a functionally related displacement on a leakport away from its associated leakport lever via suitable control means; the leakport displacement causes a functionally related pilot pressure variation in a control relay means which produces a branch pressure output functionally related to the change in pilot pressure; the branch pressure variation causes a repositioning, via a fluid or pneumatic motor means, of displaceable controller element such as a process control valve stem; the controller element causes a functionally related displacement to be imparted to the leakport lever, via a feedback means, whereby the leakport lever is constrained to follow the leakport at a rate determined by the rate of displacement of the controller element and continuously modulate the pilot pressure until the change in pilot pressure has been overcome, whereby the relay will be balanced and the controller element will be stopped after a displacement determined by the duration modulated signal and the variation in the process parameter sensed by the computer will be corrected.

It is to be understood that the various embodiments of the invention shown and described herein are for the purpose of example only and is not intended to limit the scope of the appended claims.

What is claimed is:

1. A process control means for controlling process parameters comprising input means for sensing a variation in a process parameter and producing a duration-modulated multiple state electric signal in response thereto, electro-pneumatic converter means for producing a pneumatic pressure change having a predetermined functional relationship with said electric signal, said pressure change comprising an increase or decrease of pneumatic pressure determined, respectively, by the state of said electric signal, said increase or decrease having a manitude proportional to the duration of said signal in a respective state thereof, displaceable controller means actuated by said pneumatic pressure from a first position through a displacement having a direction determined by the state of said electric signal and a magnitude determined by the duration of said signal in a respective state thereof, and feedback means interconnecting said controller means and said converter means, said feedback means acting on said converter means to continuously modulate said converter means in response to the displacement of said controller means until the effect of said pressure change on said controller means is equalized, whereby said controller means will stop in a second potion.

2. The invention defined in claim 1, wherein said electro-pneumatic converter comprises multi-directional electric servo-motor means having motor output means actuated through a predetermined displacement and in a direction determined by the duration and state, respectively, of said duration-modulated multiple-state electric signal, a pneumatic relay having a branch pressure chamber and a pilot chamber with a constant source of pressure supplied thereto, a variable bleed means connected with said pilot chamber to variably exhaust pressure therefrom and control the pilot pressure therein, first control means for said variable bleed means driven by said motor output means for varying the bleed rate thereof in response to said duration-modulated multiple-state signal, whereby said pilot pressure is varied causing said relay to vary the branch pressure in said branch pressure chamber; a second control means for said variable bleed means and resilient means interconnecting said first and second control means and biasing said second control means to counteract said first control means, said displaceable controller means including pneumatic motor means actuated in response to said branch pressure and a displaceable means adapted to be displaced by said pneumatic motor means; and said feedback means comprises drive means interconnecting said displaceable means and said second control means, said drive means acting to constrain said second control means in accordance with the rate of displacement of said displaceable means, whereby the affect of said first control means on said variable bleed means is continually modulated during displacement of said displaceable means.

3. The invention defined in claim 2, wherein said motor output means comprises a rotary shaft; said variable bleed means comprises a leakport; said first control means comprises lever means pivoted at one end and carrying said leakport at the other end, and first rotary cam means driven by said motor shaft and engaging said lever means intermediate the ends thereof; said second control means comprises a leakport lever pivoted at one end and positioned adjacent the leakport intermediate its ends and a second rotary cam means engaging said leakport lever intermediate its ends for constraining said leakport lever with respect to said leakport; and said feedback means comprises a gear train, first and second shaft means interconnected through said gear train, a drum axially connected to said first shaft means, elongated flexible means wound on said drum at one end thereof and connected with said displaceable means at the other end, said second shaft means being axially connected with said second rotary cam means.

4. The invention defined in claim 2, wherein said motor output means comprises a rotary shaft; said variable bleed means comprises a leakport; said first control means comprises a first rotary control assembly driven by said motor shaft and support means on said assembly retaining said leakport on said assembly radially of the axis of rotation thereof; said resilient means comprises a torsion means; said second control means comprises a leakport lever extending radially from the axis of said torsion means at one end to a position adjacent said leakport intermediate its ends and a second rotary control assembly engaging said leakport lever intermediate its ends for constraining said leakport lever with respect to said leakport against the action of said torsion means; and said feedback means comprises a gear train, first and second shaft means interconnected with said first shaft means, elongated flexible means wound on said drum at one end thereof and connected with said displaceable means at the other end, said second shaft means being axially connected with said second rotary control assembly.

5. In a process control system including computer means for sensing variations in process parameters and generating multiple-state duration-modulated electric signals in response thereto and further including a displaceable controller means for controlling said parameters, said controller being displaced by a pneumatic motor means, the invention comprising electro-pneumatic converter means for producing a branch pressure for actuating said pneumatic motor means and said controller means to produce a displacement of said controller means having a magnitude and direction determined by the duration and state, respectively, of said electric signals, said converter means comprising multi-directional electric servo-motor means having motor output means actuated through a predetermined displacement and in a direction determined by the said duration and state, respectively, of said electric signal, a pneumatic relay having a branch pressure chamber and a pilot chamber with a constant source of pressure supplied thereto, a variable bleed means connected with said pilot chamber to variably exhaust pressure therefrom and control the pilot pressure therein, first control means for said variable bleed means driven by said motor output means for varying the bleed rate thereof in response to said electric signal, whereby said pilot pressure is varied causing said relay to vary the branch pressure in said branch pressure chamber, a second control means for said variable bleed means and resilient means interconnecting said first and second control means and biasing said second control means to counteract said first control means.

6. The invention defined in claim 5, wherein said motor output means comprises a rotary shaft; said variable bleed means comprises a leakport; said first control means comprises lever means pivoted at one end and carrying said leakport at the other end, and first rotary cam means driven by said motor shaft and engaging said lever means intermediate the ends thereof; and said second control means comprises a leakport lever pivoted at one end and positioned adjacent the leakport intermediate its ends, and a second rotary cam means engaging said leakport lever intermediate its ends for constraining said leakport lever with respect to said leakport, said second rotary cam means being driven in response to a displacement of said displaceable controller means.

7. The invention defined in claim 5, wherein said motor output means comprises a rotary shaft; said variable bleed means comprises a leakport; said first control means comprises a first rotary control assembly driven by said motor shaft and support means on said assembly retaining said leakport on said assembly radially of the axis of rotation thereof; said resilient means comprises a torsion means; and said second control means comprises a leakport lever extending radially from the axis of rotation of said torsion means at one end to a position adjacent said leakport intermediate its ends and a second rotary control assembly engaging said leakport lever intermediate its ends for constraining said leakport lever with respect to said leakport against the action of said torsion means, said second rotary control assembly being driven in response to a displacement of said displaceable controller means.

8. In a process control system including computer means for sensing variations in process parameters and generating multiple-state duration-modulated electric signals in response thereto and further including a displaceable controller means for controlling said parameters, said controller being displaced by a pneumatic motor means, the invention comprising the combination of electro-pneumatic converter means for producing a branch pressure for actuating said pneumatic motor means and said controller means to produce a displacement of said controller means having a magnitude and direction determined by the duration and state, respectively, of said electric signals, and feedback means interconnecting said controller means and said electric-pneumatic converter means, said feedback means acting on said converter means to continuously modulate said converter means until the affect of said pressure change on said controller means is equalized.

9. The invention defined in claim 8, wherein said converter means comprises multi-directional electric servo-motor means having motor output means actuated through a predetermined displacement and in a direction determined by the said duration and state, respectively, of said electric signal, a pneumatic relay having a branch pressure chamber and a pilot chamber with a constant source of pressure supplied thereto, a variable bleed means connected with said pilot chamber to variably exhaust pressure therefrom and control the pilot pressure therein, first control means for said variable bleed means driven by said motor output means for varying the bleed rate thereof in response to said electric signal, whereby said pilot pressure is varied causing said relay to vary the branch pressure in said branch pressure chamber, a second control means for said variable bleed means and resilient means interconnecting said first and second control means and biasing said second control means to counteract said first control means; and said feedback means comprises drive means interconnecting said displaceable controller means and said second control means, said drive means acting to constrain said second control means in accordance with the rate of displacement of said displacable controller means, whereby the affect of said first control means on said variable bleed means is continually modulated during displacement of said displaceable controller means.

10. The invention defined in claim 9, wherein said motor output means comprises a rotary shaft; said variable bleed means comprises a leakport; said first control means comprises lever means pivoted at one end and carrying said leakport at the other end, and first rotary cam means driven by said motor shaft and engaging said lever means intermediate the ends thereof; said second control means comprises a leakport lever pivoted at one end and positioned adjacent the leakport intermediate its ends and a second rotary cam means engaging said leakport lever intermediate its ends for constraining said leakport lever with respect to said leakport; and said drive means of said feedback means comprises a gear train, first and second shaft means interconnected through said gear train, a drum axially connected to said first shaft means, elongated flexible means wound on said drum at one end thereof and connected with said displaceable controller means at the other end, said second shaft means being axially connected with said second rotary cam means.

11. The invention defined in claim 9, wherein said motor output means comprises a rotary shaft; said variable bleed means comprises a leakport; said first control means comprises a first rotary control assembly driven by said motor shaft and support means on said assembly retaining said leakport on said assembly radially of the axis of rotation thereof; said resilient means comprises a torsion means; said second control means comprises a leakport lever extending radially from the axis of said torsion means at one end to a position adjacent said leakport intermediate its ends and a second rotary control assembly engaging said leakport lever intermediate its ends for constraining said leakport lever with respect to said leakport against the action of said torsion means; and said drive means of said feedback means comprises a gear train, first and second shaft means interconnected through said gear train, a drum axially connected with said first shaft means, elongated flexible means wound on said drum at one end thereof and connected with said displaceable controller means at the other end, said second shaft means being axially connected with said second rotary control assembly.

References Cited by the Examiner

UNITED STATES PATENTS

| | | | |
|---|---|---|---|
| 2,789,543 | 4/57 | Popowsky | 91—387 |
| 2,985,808 | 12/59 | Ketchledge | 318—20.209 |
| 3,038,449 | 6/62 | Murphy et al. | 91—363 |
| 3,040,715 | 6/62 | McCombs et al. | 91—382 |
| 3,101,031 | 8/63 | Crossley | 91—387 |

FRED E. ENGELTHALER, *Primary Examiner.*

SAMUEL LEVINE, *Examiner.*